United States Patent
Nakamura

(10) Patent No.: US 11,098,881 B2
(45) Date of Patent: Aug. 24, 2021

(54) LIGHT-VEHICLE LIGHT

(71) Applicant: Cateye Co., Ltd., Osaka (JP)

(72) Inventor: Naoya Nakamura, Osaka (JP)

(73) Assignee: CATEYE CO., LTD., Osaka (JP)

( * ) Notice: Subject to any disclaimer, the term of this patent is extended or adjusted under 35 U.S.C. 154(b) by 0 days.

(21) Appl. No.: 16/668,641

(22) Filed: Oct. 30, 2019

(65) Prior Publication Data
US 2020/0132279 A1    Apr. 30, 2020

(30) Foreign Application Priority Data

Oct. 31, 2018  (JP) ............... JP2018-204628

(51) Int. Cl.
*F21V 19/00*  (2006.01)
*F21S 9/02*   (2006.01)

(52) U.S. Cl.
CPC ............ *F21V 19/0035* (2013.01); *F21S 9/02* (2013.01)

(58) Field of Classification Search
CPC . F21V 19/0035; F21S 9/02; F21S 9/00; B62J 6/02; B62J 6/00; B62J 6/03
USPC ......................................... 362/473, 474, 191
See application file for complete search history.

(56) References Cited

U.S. PATENT DOCUMENTS

| 3,340,390 A | * | 9/1967 | Imre | F21S 9/02 362/191 |
| 3,612,853 A | * | 10/1971 | Aoki | F21V 23/0414 362/191 |
| 4,533,982 A | * | 8/1985 | Kozar | F21V 23/0414 362/183 |
| 5,444,607 A | * | 8/1995 | Dreyfuss | A63H 27/10 362/352 |
| 5,573,329 A | * | 11/1996 | van Gennep | B25B 7/22 248/229.13 |
| 5,695,271 A | * | 12/1997 | Zeller | F21V 21/22 362/191 |
| 5,823,657 A | * | 10/1998 | Price | F16M 11/40 362/191 |
| 5,860,728 A | | 1/1999 | Maglica | |
| 6,315,426 B1 | * | 11/2001 | Buller, Jr. | A45F 3/14 362/103 |

(Continued)

FOREIGN PATENT DOCUMENTS

CN  107662675 A   2/2018
JP  S62-120283 A  6/1987
(Continued)

OTHER PUBLICATIONS

Extended European Search Report issued in counterpart European Patent Application No. 19203434.6 dated Feb. 18, 2020.
(Continued)

*Primary Examiner* — Anabel Ton
(74) *Attorney, Agent, or Firm* — Morgan, Lewis & Bockius LLP

(57) ABSTRACT

A light-vehicle light attachable to a light vehicle, such as a bicycle, using a fixture includes: a first member including a light emitter; and a second member including a region fixable to the fixture, wherein the first member is detachably fixable to the second member at a plurality of selective angles including, a first angle and a second angle for vertical inversion of a light distribution of light from the light emitter with respect to the second member.

11 Claims, 13 Drawing Sheets

(56) References Cited

U.S. PATENT DOCUMENTS

| | | | |
|---|---|---|---|
| 6,711,006 B2* | 3/2004 | Chen | F16M 11/14 |
| | | | 248/231.31 |
| 6,733,153 B1* | 5/2004 | Lee | F21L 4/00 |
| | | | 362/191 |
| 6,749,166 B2* | 6/2004 | Valentine | F16M 11/40 |
| | | | 24/115 H |
| 7,572,024 B2* | 8/2009 | Ko | A47J 37/0786 |
| | | | 126/213 |
| 7,780,321 B1 | 8/2010 | Retief | |
| 7,896,520 B1* | 3/2011 | Norling | A47J 37/0786 |
| | | | 362/191 |
| 8,251,536 B2* | 8/2012 | Bevirt | F16M 11/16 |
| | | | 362/190 |
| 8,360,597 B1* | 1/2013 | Hanchett | B25F 5/021 |
| | | | 362/119 |
| 8,870,414 B2* | 10/2014 | Goeckel | F21V 7/043 |
| | | | 362/249.03 |
| 2002/0021566 A1* | 2/2002 | Lee | F21V 21/0885 |
| | | | 362/190 |
| 2010/0246199 A1 | 9/2010 | Ma et al. | |
| 2010/0301779 A1* | 12/2010 | Spartano | H05B 45/00 |
| | | | 315/320 |
| 2011/0141751 A1 | 6/2011 | Wei | |
| 2011/0222274 A1* | 9/2011 | Ko | F21V 21/08 |
| | | | 362/191 |
| 2012/0182724 A1* | 7/2012 | Janice | F21L 15/14 |
| | | | 362/158 |
| 2013/0182423 A1* | 7/2013 | Matthews | F21V 33/0008 |
| | | | 362/191 |
| 2013/0250593 A1* | 9/2013 | Popper | F21L 15/14 |
| | | | 362/476 |
| 2014/0334138 A1 | 11/2014 | Jigamian et al. | |
| 2015/0036348 A1* | 2/2015 | Dong | F21V 14/08 |
| | | | 362/293 |
| 2015/0239518 A1 | 8/2015 | Lee et al. | |
| 2017/0190371 A1 | 7/2017 | Su | |
| 2018/0202643 A1* | 7/2018 | Wang | F21S 4/28 |
| 2018/0320885 A1* | 11/2018 | Musser | F21S 4/28 |

FOREIGN PATENT DOCUMENTS

| | | |
|---|---|---|
| JP | H02-24794 U | 2/1990 |
| JP | H06-071381 U | 10/1994 |
| JP | 3028283 U | 8/1996 |
| JP | 2007-106343 A | 4/2007 |
| JP | 2007-513487 A | 5/2007 |
| JP | 2008-078086 A | 4/2008 |
| JP | 2009-003104 A | 1/2009 |
| TW | 2007-08433 A | 3/2007 |
| TW | M471408 U | 2/2014 |
| WO | 2005/057080 A2 | 6/2005 |

OTHER PUBLICATIONS

Office Action issued in counterpart Japanese Patent Application No. 2018-204628 dated Mar. 31, 2020.

Office Action issued in counterpart Taiwanese Patent Application No. 108137473 dated May 29, 2020.

Office Action issued in counterpart Chinese Patent Application No. 201911046239.1 dated Dec. 1, 2020.

* cited by examiner

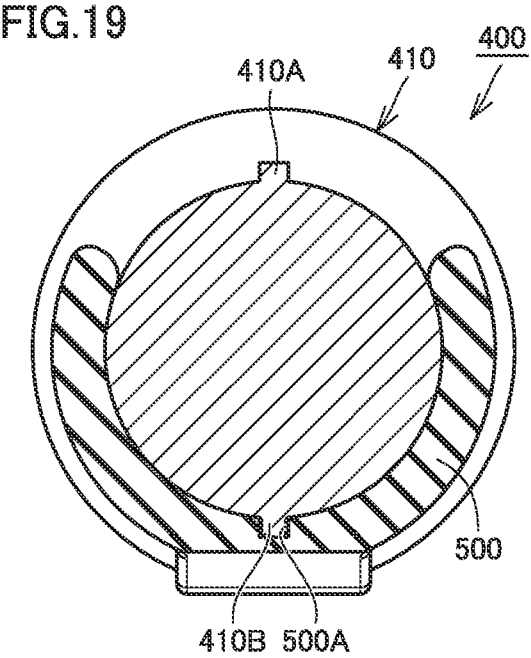

LIGHT-VEHICLE LIGHT

BACKGROUND OF THE INVENTION

Field of the Invention

The present invention relates to a light-vehicle light.

Description of the Background Art

A light-vehicle light attachable to a light vehicle, such as a bicycle, using a fixture has been conventionally known. Such a light is described in Japanese Patent Laying-Open No. 62-120283, for example.

SUMMARY OF THE INVENTION

The above-described light is attached to an upper side of a handlebar of a bicycle using a fixture, for example. In some cases, however, one may wish to attach the light at a lower side of the handlebar. When the light is attached to the lower side of the handlebar, the direction of the light is vertically inverted from the direction of the light when the light is attached to the upper side of the handlebar.

Meanwhile, a light-vehicle light may be required to satisfy a predetermined light distribution standard. If a product for which the light distribution standard is determined is attached in an attachment direction not intended by a designer, the predetermined light distribution standard may not be satisfied, disadvantageously. For example, when a light-vehicle light intended to be attached at an upper side is vertically inverted to be attached at a lower side, emitted light from the light-vehicle light is also vertically inverted. If an attachment direction of a light-vehicle light that provides a vertically asymmetrical light distribution to satisfy a vertically asymmetrical light distribution standard is vertically inverted, the predetermined light distribution standard may not be satisfied, disadvantageously. Moreover, some light-vehicle lights, which are not a product according to predetermined light distribution standards, may be each configured to provide a vertically asymmetrical light distribution in view of a higher and more preferable safety consideration or the like. Also when an attachment direction of such a light-vehicle light is vertically inverted, emitted light is vertically inverted.

The present invention has been made in view of the foregoing problems, and has an object to provide a light-vehicle light having an improved degree of freedom in attaching the light-vehicle light to a light vehicle.

The light-vehicle light according to the present invention is a light-vehicle light attachable to a light vehicle using a fixture. In the present specification, the term "light vehicle" is not limited to the one defined in the Japanese Road Traffic Law. Examples of the light vehicle includes not a "bicycle", which is a typical example of the light vehicle, but also a "wheelchair", a "hand truck", and the like. Typically, the term "light vehicle" refers to a vehicle that travels mainly using human power. For example, the term "bicycle" typically refers to a vehicle that travels by a human alternately pushing pedals to turn wheels: however, the scope of the term "light vehicle" in the present invention is not limited thereto. For example, when the same or equivalent light distribution standard as that for the typical "bicycle" is required, the following vehicles correspond to the "light vehicle" in the present specification: a vehicle that obtains assistance of propulsive power by way of a motor or the like; and a vehicle that travels by itself by obtaining propulsive power by way of a motor or the like.

In the present specification, the "bicycle" may be a vehicle having two wheels, or may be a vehicle having three or more wheels. A bicycle light can be attached to a handlebar, a front fork, a hub axle, or the like of the bicycle, for example.

In one aspect, the above-described light-vehicle light includes a light emitter, wherein the light emitter is detachably fixable to the fixture at a plurality of selective angles including a first angle and a second angle for vertical inversion of a light distribution of light from the light emitter with respect to the fixture.

In another aspect, the above-described light-vehicle light includes: a first member including a light emitter; and a second member including a region fixable to the fixture, wherein the first member is detachably fixable to the second member at a plurality of selective angles including a first angle and a second angle for vertical inversion of a light distribution of light from the light emitter with respect to the second member.

Here, the expression "vertical inversion" means "vertical inversion" in such a state that the light-vehicle light is fixed to the light vehicle using the fixture.

According to one embodiment, in the above-described light-vehicle light, the second member includes a power supply storage that stores a power supply that supplies power to the light emitter.

According to one embodiment, in the above-described light-vehicle light, the first member includes a power supply storage that stores a power supply that supplies power to the light emitter.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 19 is a cross sectional view along XIX-XIX in FIG. 18.

DESCRIPTION OF THE PREFERRED EMBODIMENTS

Figure 1:
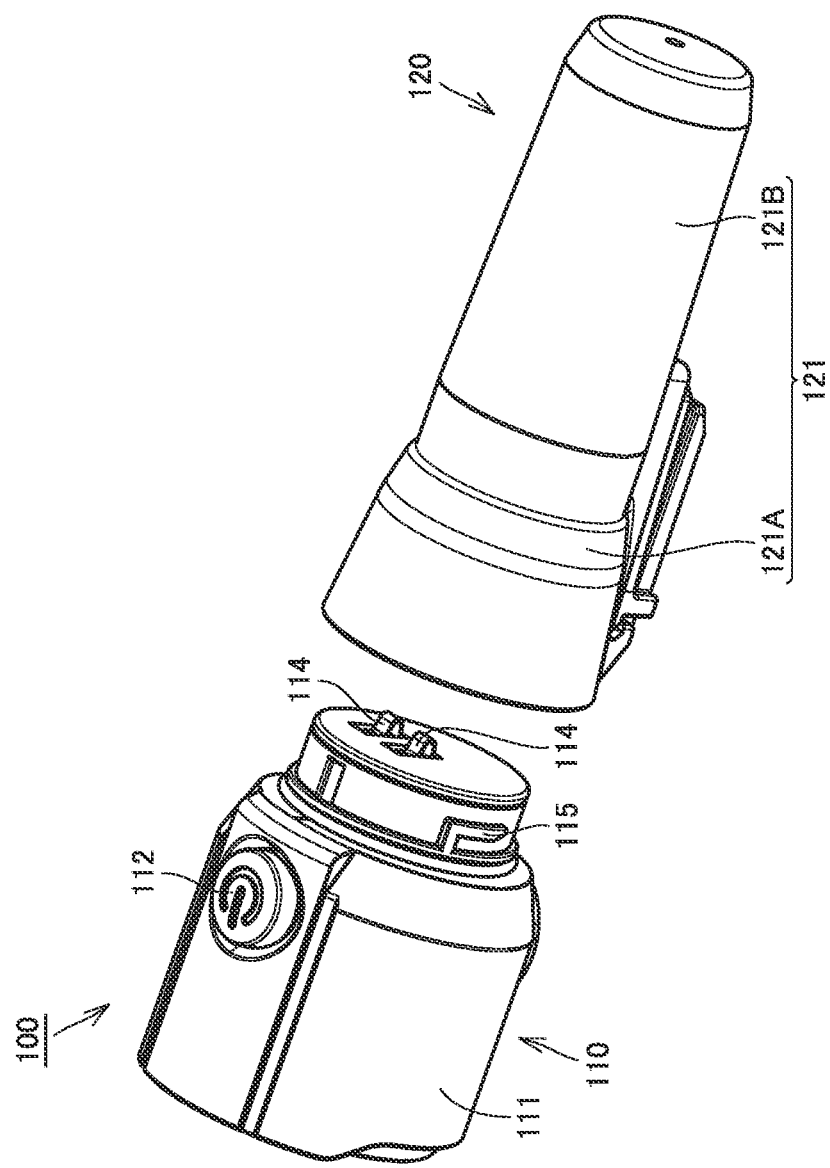
FIG. 1 is an exploded perspective view of a bicycle light according to a first embodiment of the present invention.

The following describes embodiments of the present invention. It should be noted that the same or corresponding components will be given the same or corresponding reference characters and may not described repeatedly.

It should be noted that when referring to the number, an amount, and the like in each of the below-described embodiments, the scope of the present invention is not necessarily limited to the number, the amount, and the like unless otherwise stated particularly. Moreover, in each of the below-described embodiments, each component is not necessarily essential for the present invention unless otherwise particularly described.

First Embodiment

Figure 2:
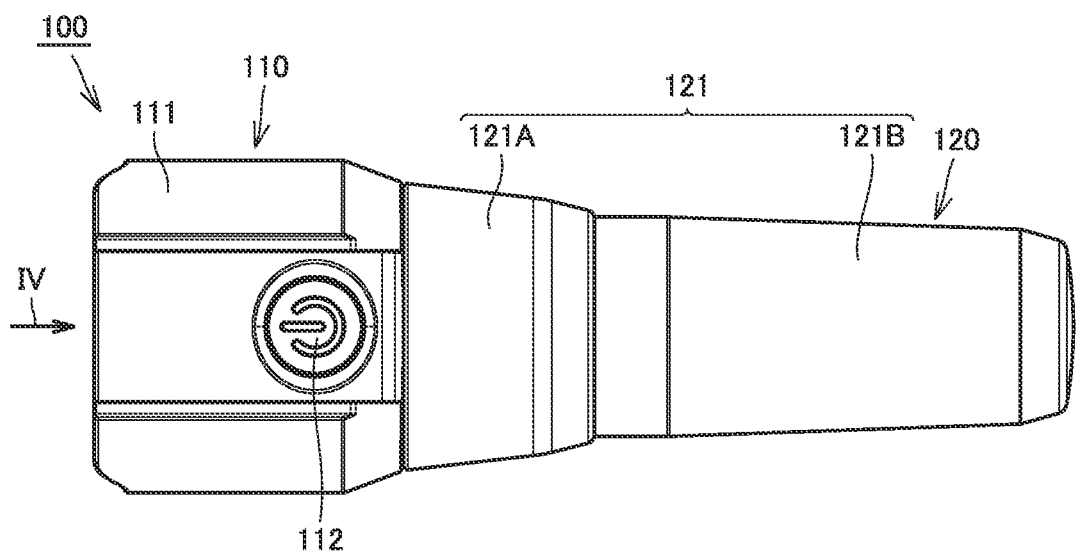
FIG. 2 is an upper view of the bicycle light according to the first embodiment of the present invention.
Figure 3:
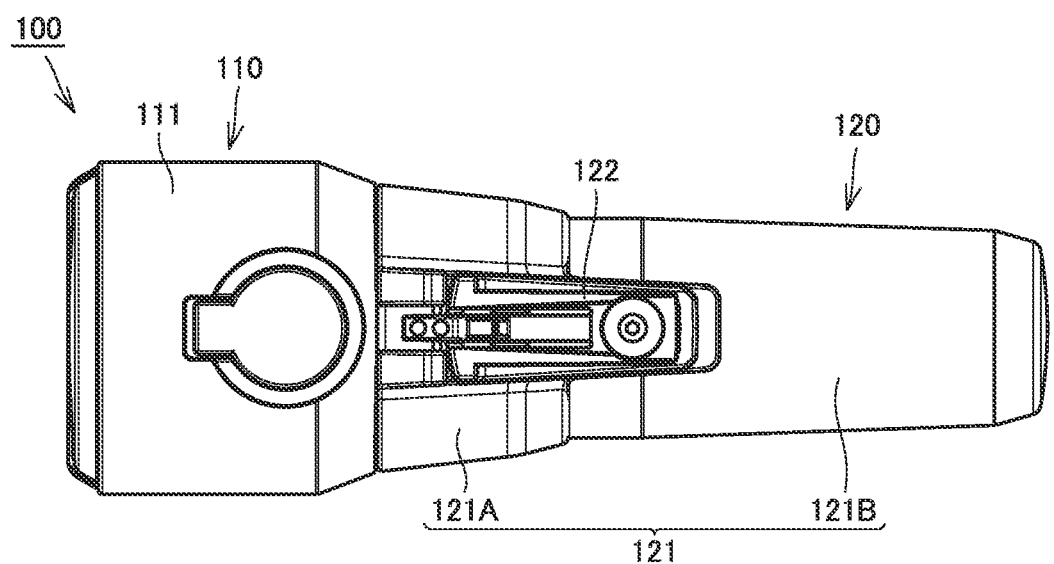
FIG. 3 is a bottom view of the bicycle light according to the first embodiment of the present invention.
Figure 4:
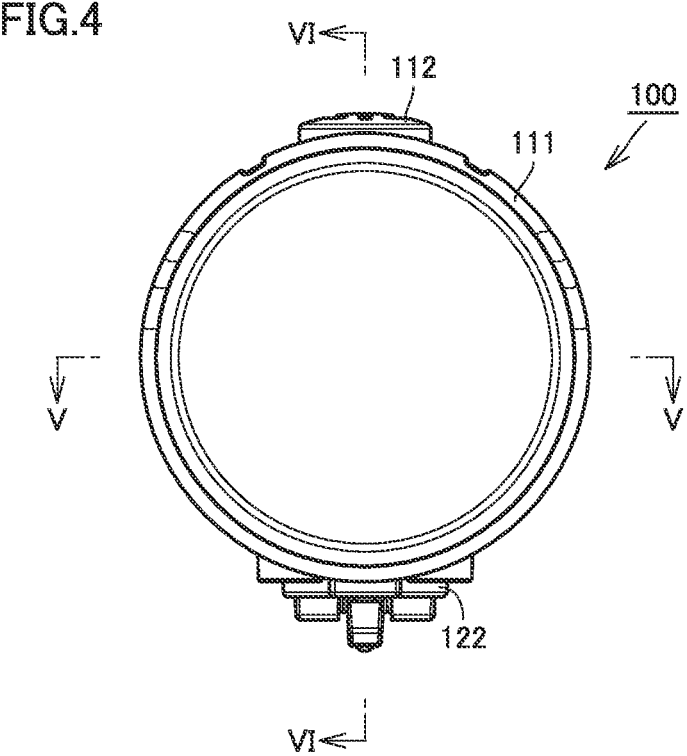
FIG. 4 is a front view of the bicycle light according to the first embodiment of the present invention (when seen in a IV direction in FIG. 2).
Figure 5:
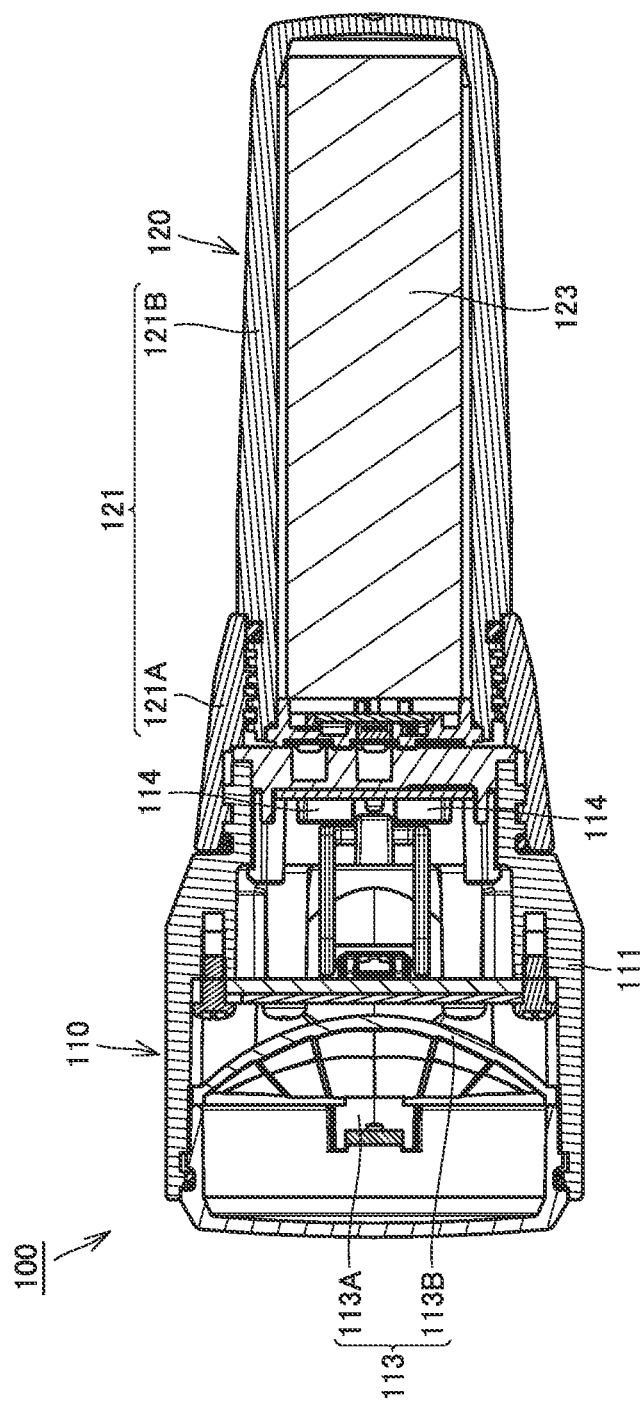
FIG. 5 is a cross sectional view along V-V in FIG. 4.
Figure 6:
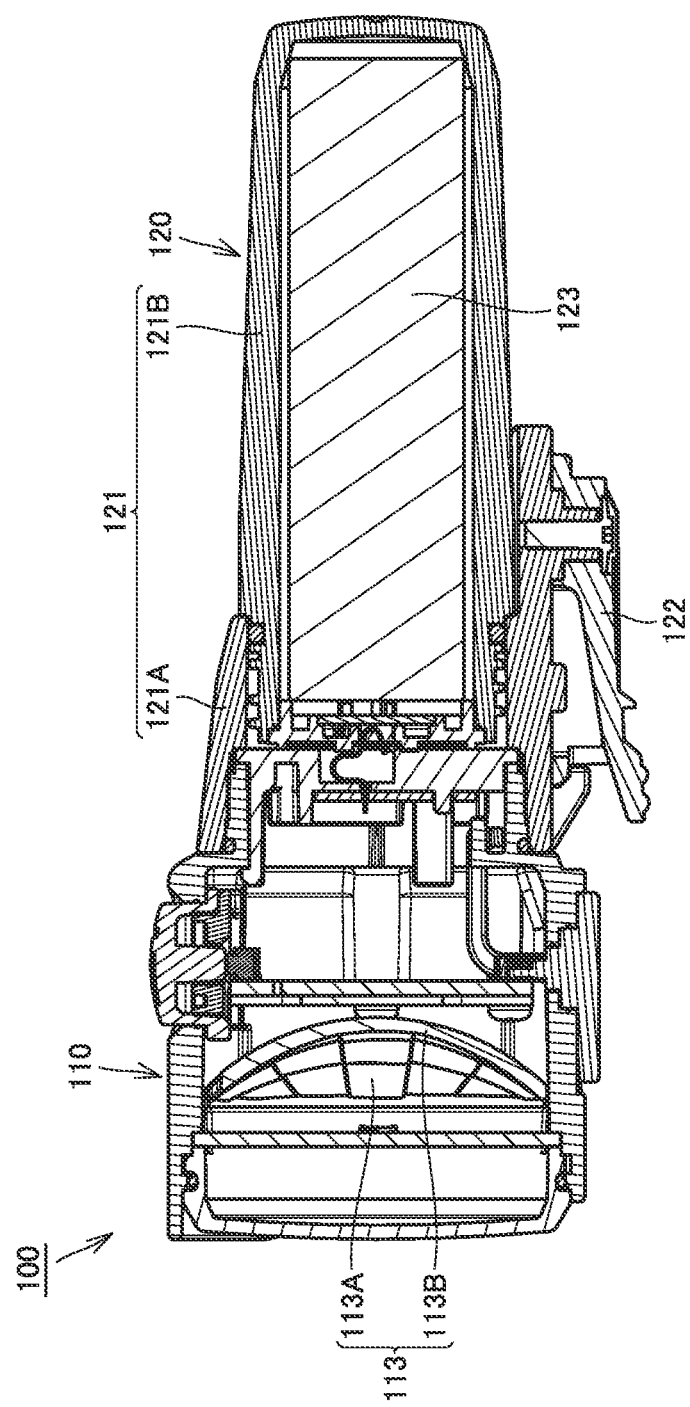
FIG. 6 is a cross sectional view along VI-VI in FIG. 4.

With reference to FIG. 1 to FIG. 6, the following describes a light-vehicle light according to a first embodiment. FIG. 1 is an exploded perspective view of a bicycle light 100 (light-vehicle light) according to the present embodiment. FIG. 2 is an upper view of bicycle light 100. FIG. 3 is a bottom view of bicycle light 100. FIG. 4 is a front view of bicycle light 100. FIG. 5 is a cross sectional vies along V-V in FIG. 4. FIG. 6 is a cross sectional view along VI-VI in FIG. 4.

As shown in FIG. 1 to FIG. 6, bicycle light 100 includes a first member 110 and a second member 120. First member 110 and second member 120 are attachable to and detachable from each other.

First member 110 includes a housing 111, a switching button 112, a light emitter 113, an electrode 114, and protrusions 115. Second member 120 includes a housing 121 and a bracket attachment portion 122. A power supply 123 is stored in housing 121 of second member 120. That is, housing 121 of second member 120 constitutes a power supply storage that stores power supply 123.

Housing 111 stores light emitter 113. Switching button 112 is a button for switching between turning-on and turning-off for emission of light from light emitter 113 or switching between strong, intensity and weak intensity of the emitted light. Light emitter 113 includes a light emitting element 113A and a reflector 113B. Light emitting element 113A is an LED element, for example. Reflector 113B reflects the light emitted from light emitting element 113A to direct the light toward the front of bicycle light 100. By adjusting, the shape of reflector 113B, a light distribution satisfying, a predetermined light distribution standard is realized. For example, in order to satisfy a vertically asymmetrical light distribution standard, reflector 113B may have a vertically asymmetrical shape. Power of power supply 123 is supplied to light emitting element 113A via electrode 114.

As shown in FIG. 1, each of protrusions 115 is formed on housing 111. Protrusion 115 is formed on housing 111 at a portion that is insertable into second member 120. By inserting, into housing 121, housing 111 htiving protrusions 115 formed thereon and performing relative rotation thereof around an axial direction, first member 110 is fixed to second member 120. By performing relative rotation in an opposite direction, first member 110 can be detached from second member 120. Thus, first member 110 is attachable to and detachable from second member 120.

Two protrusions 115 are provided at positions shifted from each other by 180° in a circumferential direction of housing 111. Two protrusions 115 have the same shape. Therefore, first member 110 can be fixed to second member 120 at a first angle and a second angle, which are shifted from each other by 180° in the circumferential direction.

In comparison between a first state in which first member 110 is attached to second member 120 at the first angle and bicycle light 100 is fixed to the bicycle and a second state in which first member 110 is attached to second member 120 at the second angle and bicycle light 100 is fixed to the bicycle, a light distribution of the emitted light from light emitter 113 to the front of bicycle light 100 is vertically inverted. In other word, the first angle (first state) and the second angle (second state) are set to attain vertical inversion of the light distribution of the light from light emitter 113 with bicycle light 100 being fixed to the bicycle. Specifically, a positional relation is adjusted between protrusion 115 in first member 110 and bracket attachment portion 122 in second member 120.

Housing 121 of second member 120 includes a first portion 121A and a second portion 121B. Fast portion 121A and second portion 121B are formed as two separate members and are fixed to each other to constitute housing 121. First portion 121A of housing 121 can be detachably tried to housing 111 of first member 110. Bracket attachment portion 122 formed at a lower portion of housing 121 is a region that can be fixed to the bracket (fixture) that can be fixed to the bicycle. By engaging bracket attachment portion 122 with the fixed bracket of the bicycle, bicycle light 100 is fixed to the bicycle.

In bicycle light 100 according to the present embodiment, since first member 110 can be fixed to second member 120 at the first angle and the second angle, which are shifted from each other by 180° in the circumferential direction, the light distribution of the emitted light from light emitter 113 can be vertically inverted. Therefore, even when the attachment direction of bicycle light 100 that provides a vertically asymmetrical light distribution has to be vertically inverted due to some reason in attaching bicycle light 100 to the bicycle, a light distribution comparable to the light distribution before changing the attachment direction can be realized.

Thus, according to bicycle light 100 according to the present embodiment, a degree of freedom in attaching bicycle light 100 to the bicycle can be improved while satisfying the predetermined light distribution standard.

Second Embodiment

Figure 7:
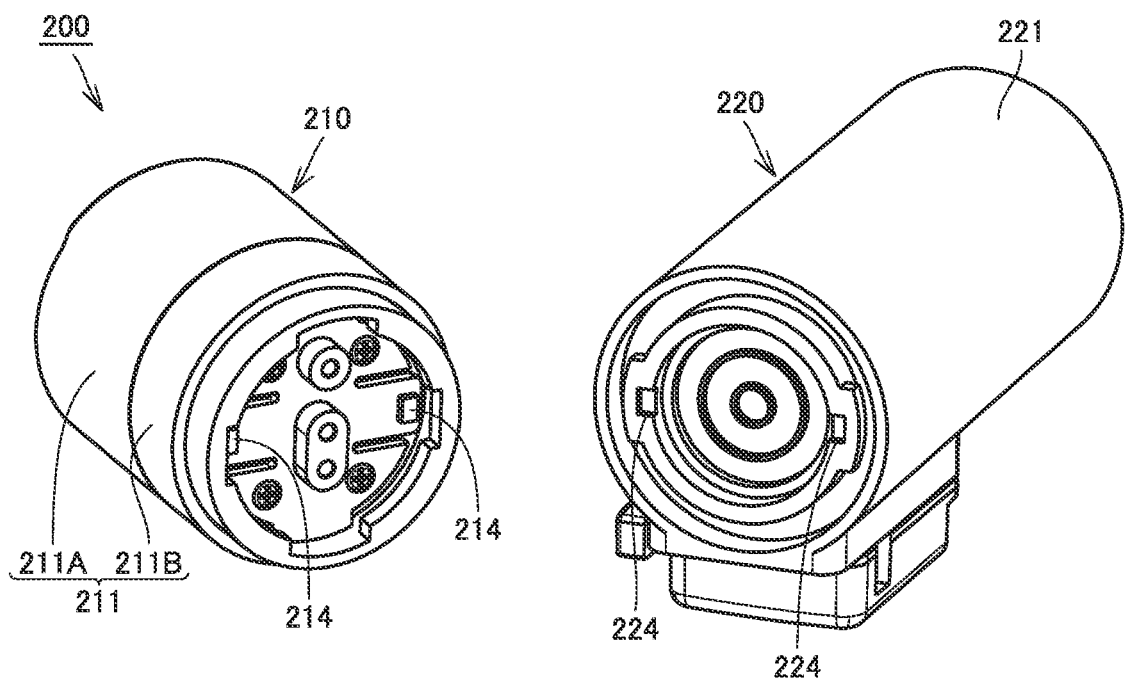
FIG. 7 is an exploded perspective view of a bicycle light according to a second embodiment of the present invention.
Figure 8:
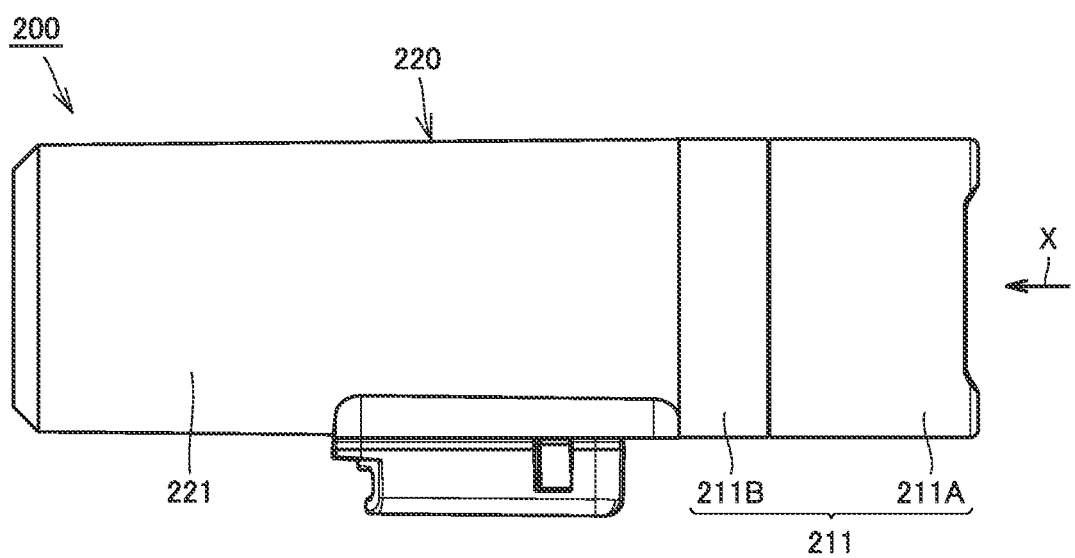
FIG. 8 is a side view of the bicycle light according to the second embodiment of the present invention.
Figure 9:
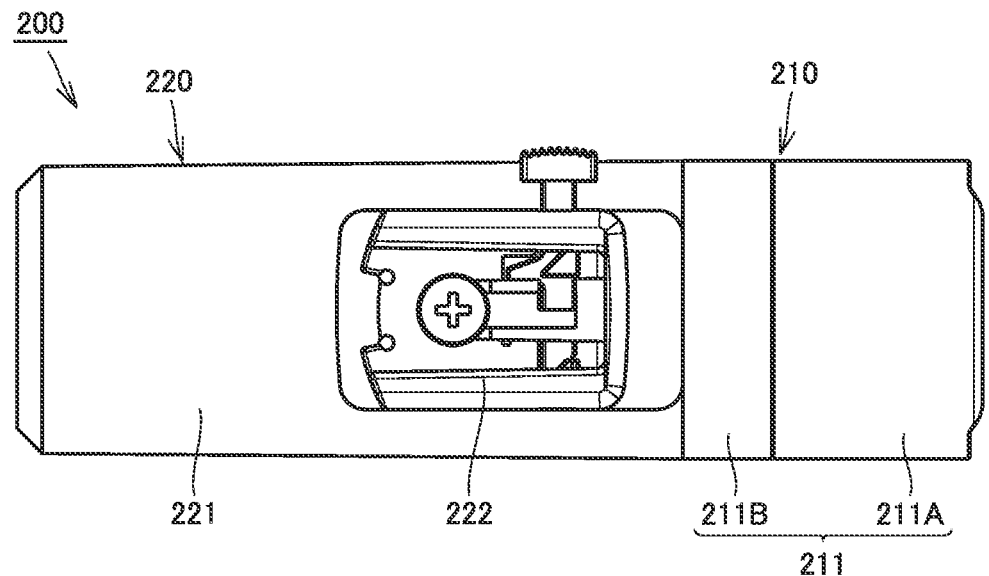
FIG. 9 is a bottom view of the bicycle light according to the second embodiment of the present invention.

With reference to FIG. 7 to FIG. 11, the following describes alight-vehicle light according to a second embodiment. FIG. 7 is an exploded perspective view of a bicycle light 200 (light-vehicle light) according to the present embodiment. FIG. 8 is a side view of bicycle light 200. FIG.

Figure 10:
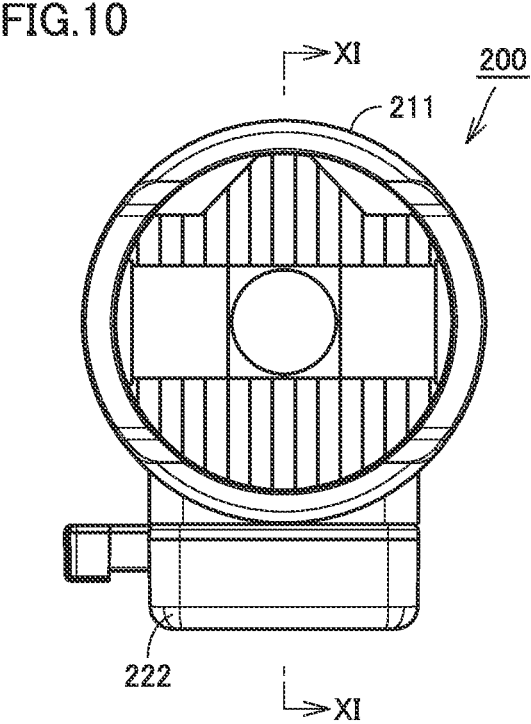
FIG. 10 is a front view of the bicycle light according to the second embodiment of the present invention (when seen in a X direction in FIG. 8).
Figure 11:
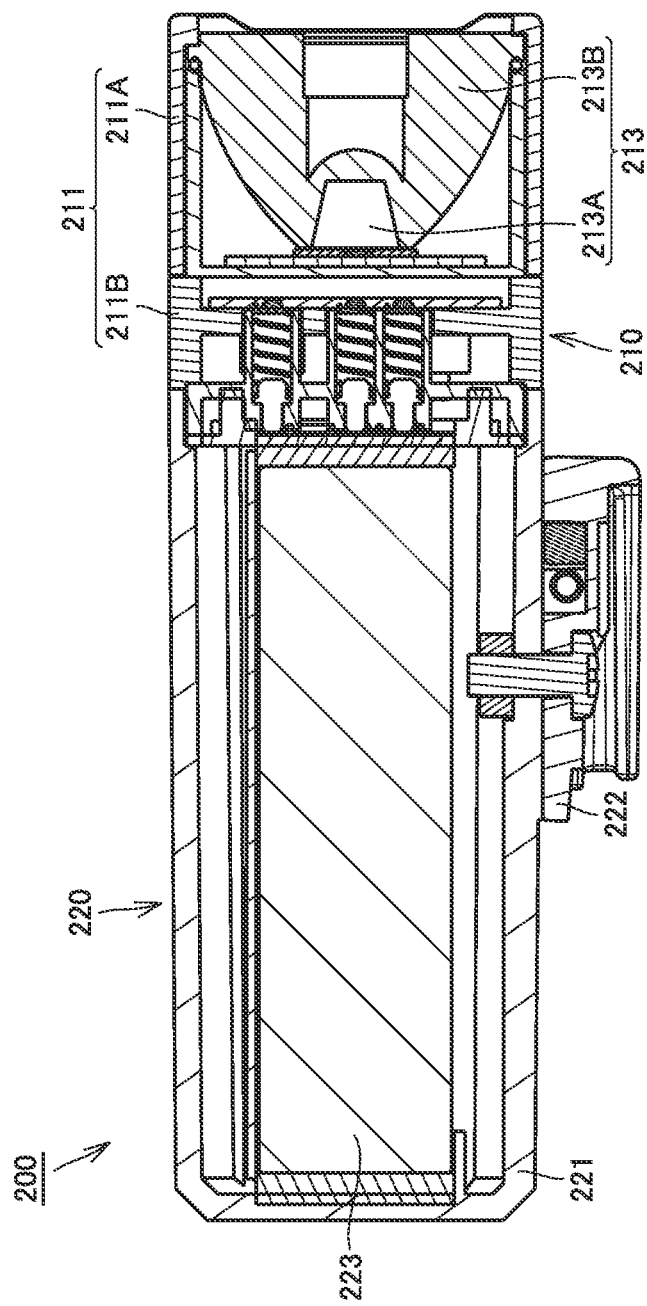
FIG. 11 is a cross sectional view along XI-XI in FIG. 10.

9 is a bottom view of bicycle light 200. FIG. 10 is a front view of bicycle light 200. FIG. 11 is a cross sectional view along XI-XI in FIG. 10.

Bicycle light 200 according to the second embodiment is a modification of that of the first embodiment. As shown in FIG. 7 to FIG. 11, bicycle light 200 includes a first member 210 and a second member 220. First member 210 and second member 220 are attachable to and detachable from each other.

First member 210 includes a housing 211 and a light emitter 213. Second member 220 includes a housing 221 and a bracket attachment portion 222. A power supply 223 is stored in housing 221 of second member 220. That is, housing 221 of second member 220 constitutes a power supply storage that stores power supply 223.

Housing 211 includes a first portion 211A and a second portion 211B. Housing 211 stores light emitter 213. Light emitter 213 includes: a light emitting element 213E constituted of, for example, an LED element; and a reflector 213B that reflects emitted light from light emitting element 213A to direct the light toward the front of bicycle light 200. By performing relative rotation of first portion 211A and second portion 211B of housing 211, it is possible to switch between turning-on, and turning-off for emission of light from light emitter 213 or switch between strong intensity and weak intensity of the emitted light.

As shown in FIG. 7, engagement portions 214 are formed on housing 211 and engagement portions 224 are formed on housing 221. By engaging respective engagement portions 214, 224 with each other, first member 210 is fixed to second member 220. Two engagement portions 214 are provided at positions shifted from each other by 180° in the circumferential direction of housing 211, and two engagement portions 224 are provided at positions shifted from each other by 180° in the circumferential direction of housing 221. Two engagement portions 214 have the same shape, and two engagement portions 224 have the same shape. Therefore, first member 210 can be fixed to second member 220 at a first angle and a second angle, which are shifted from each other by 180° in the circumferential direction.

In comparison between a first state in which first member 210 is attached to second member 220 at the first angle and bicycle light 200 is fixed to the bicycle and a second state in which first member 210 is attached to second member 220 at the second angle and bicycle light 200 is fixed to the bicycle, a light distribution of the emitted light from light emitter 213 to the front of bicycle light 200 is vertically inverted. In other word, the first angle (first state) and the second angle (second state) are set to attain vertical inversion of the light distribution of the light from light emitter 213 with bicycle light 200 being fixed to the bicycle. Specifically, a positional relation is adjusted between each of engagement portions 214, 224 and bracket attachment portion 222 in second member 220.

Also in the present embodiment, as with the first embodiment, since first member 210 can be fixed to second member 220 at the first angle and the second angle, which are shifted from each other by 180° in the circumferential direction, the light distribution of the emitted light from light emitter 113 can be vertically inverted. Therefore, even when the attachment direction of bicycle light 200 that provides a vertically asymtrietrical light distribution has to be vertically inverted due to some reason in attaching bicycle light 200 to the bicycle, a light distribution comparable to the light distribution before changing the attachment direction can be realized. That is, a degree of freedom in attaching bicycle light 200 to the bicycle can be improved while satisfying the predetermined light distribution standard.

Third Embodiment

Figure 12:
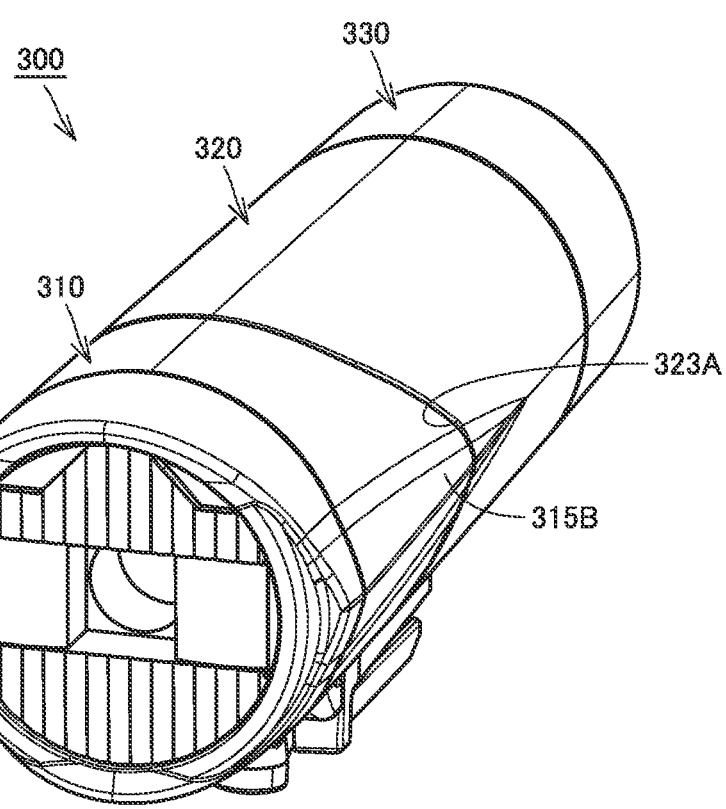
FIG. 12 is a perspective view of a bicycle light according to a third embodiment of the present invention.
Figure 13:
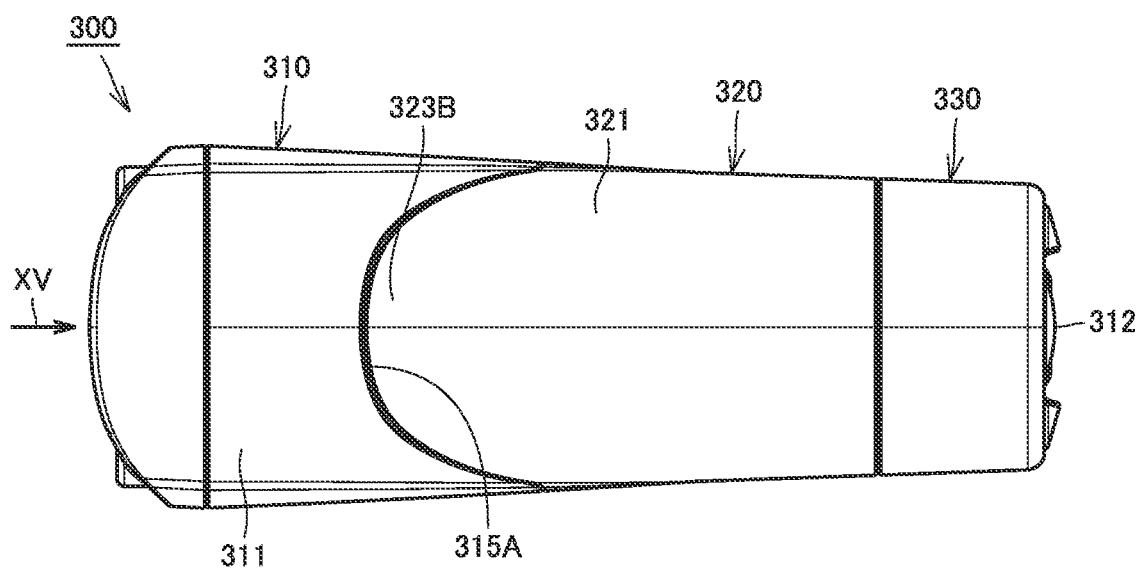
FIG. 13 is an upper view of the bicycle light according to the third embodiment of the present invention.
Figure 14:
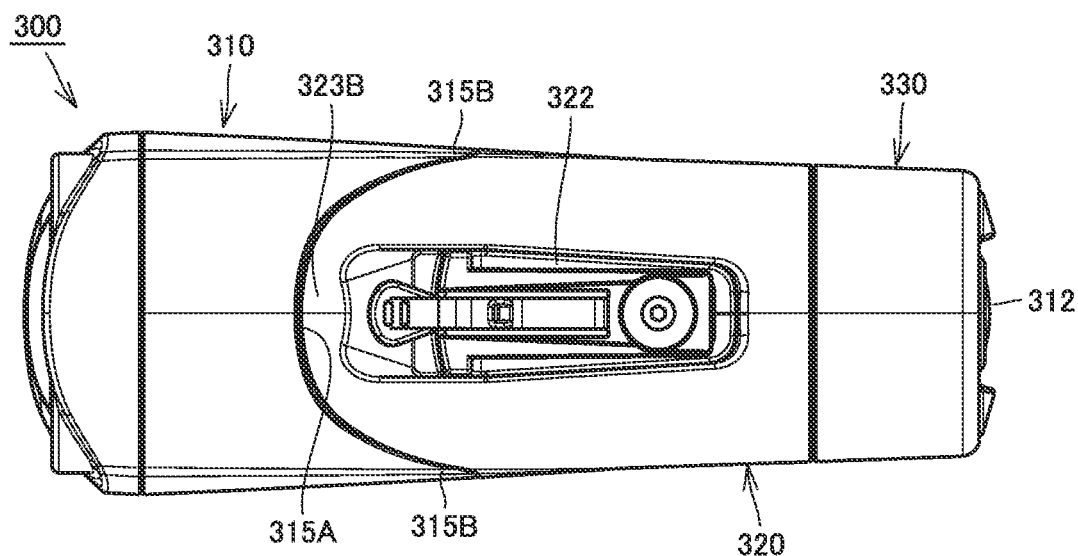
FIG. 14 is a bottom view of the bicycle light according to the third embodiment of the present invention.
Figure 15:
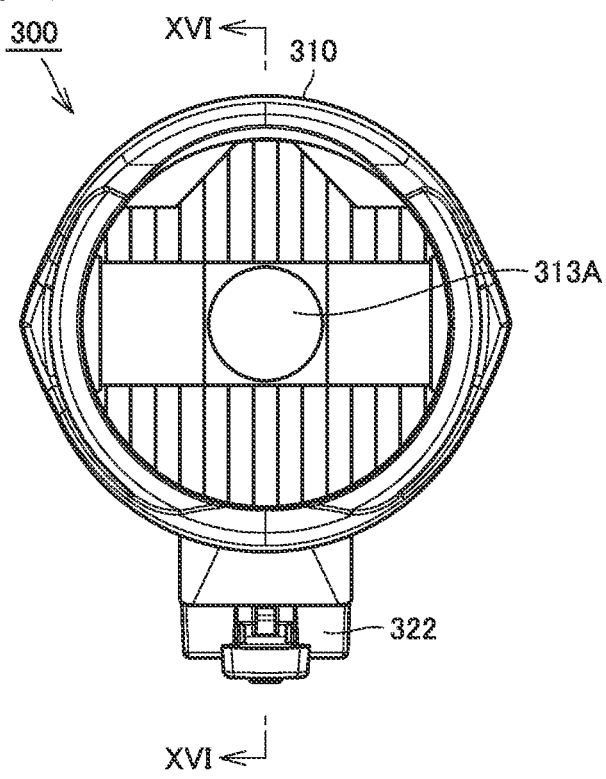
FIG. 15 is a front view of the bicycle light according to the third embodiment of the present invention (when seen in a XV direction in FIG. 13).
Figure 16:
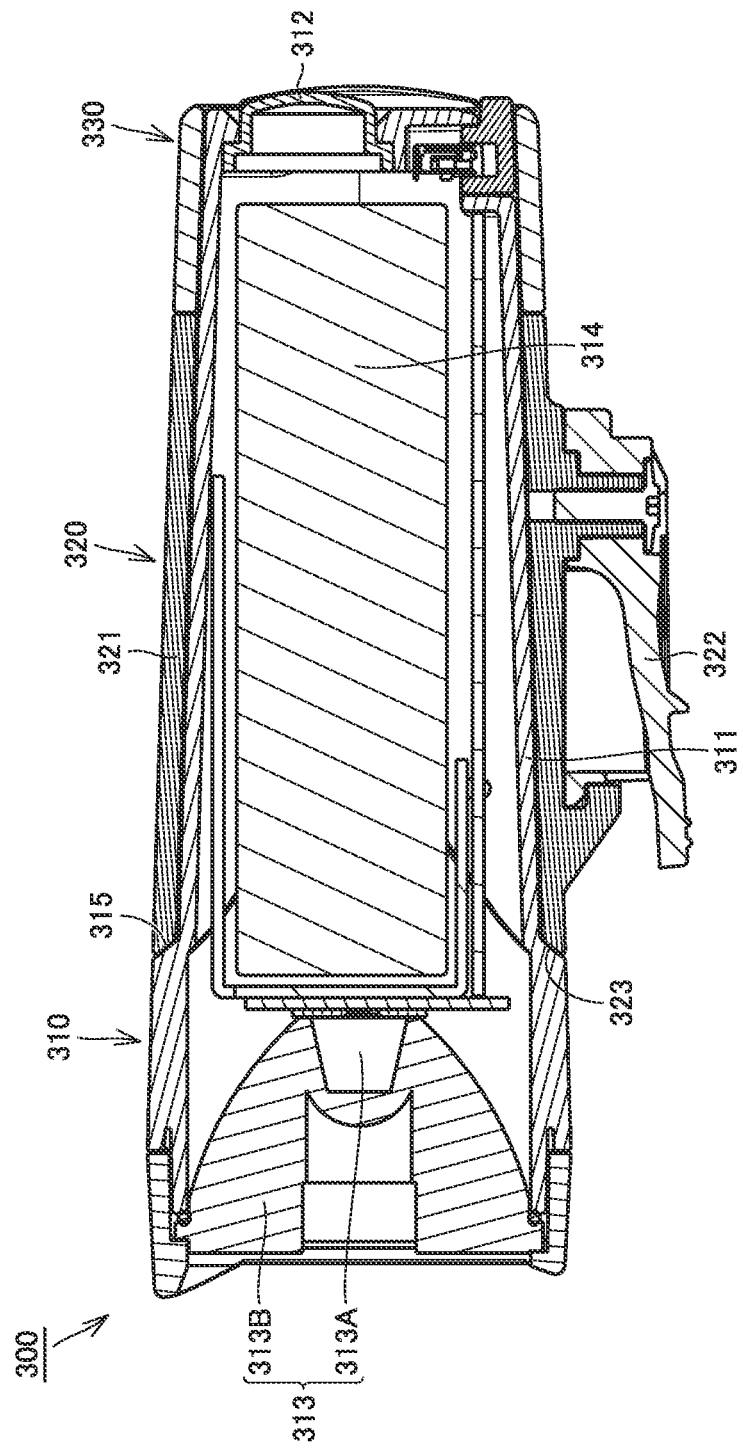
FIG. 16 is a cross sectional view along XVI-XVI in FIG. 15.

With reference to FIG. 12 to FIG. 16, the following describes a light-vehicle light according to a third embodiment. FIG. 12 is a perspective view oft bicycle light 300 (light-vehicle light) according to the present embodiment. FIG. 11 is an upper view of bicycle light 300. FIG. 14 is a bottom view of bicycle light 300. FIG. 15 is a front view of bicycle light 300. FIG. 16 is a cross sectional view along XVI-XVI in FIG. 15.

Bicycle light 300 according to the third embodiment is a modification of each of those of the first and second embodiments. As shown in FIG. 12 to FIG. 16, bicycle light 300 includes a first member 310, a second member 320, and a third member 330. First member 310, second member 320, and third member 330 can be attached to and detached from one another.

First member 310 includes a housing 311, a switching button 312, and a light emitter 313. A power supply 314 is stored in housing 311 of first member 310. That is, housing 311 of first member 310 constitutes a power supply storage that stores power supply 314. Second member 320 includes a cylindrical portion 321 and a bracket attachment portion 322.

Housing 311 stores light emitter 313. Switching button 312 is a button for switching between turning-on and turning-off for emission of light from light emitter 313 or switching between strong intensity and weak intensity of the emitted light. Light emitter 313 includes a light emitting element 313A and a reflector 313B.

As shown in FIG. 12 to FIG. 16, cylindrical portion 321 of second member 320 is placed over and engaged with housing 311 of first member 310. Third member 330 is a stopper for fixing second member 320 attached to first member 310. That is, second member 320 can be attached to and detached from first member 310.

A stepped portion 315 is formed in housing 311 of first member 310. Cylindrical portion 321 of second member 320 is placed over and engaged with housing 311 of first member 310 so as to bring a tip 323 of second member 320 into abutment with stepped portion 315 of first member 310. By attaching third member 330 with second member 320 being placed over and engaged with the first member, second member 320 is fixed to first member 310.

Stepped portion 315 formed in housing 311 of first member 310 is provided with two recesses 315A and two protrusions 315B, which are arranged in the circumferential direction of first member 310. Each of recesses 315A is recessed in a direction of separating away from second member 320, and each of protrusions 315B protrudes in a direction of approaching second member 320. Two recesses 315A have the same shape, and are formed at positions shifted from each other by 180° in the circumferential direction of first member 310. Also, two protrusions 315B have the same shape, and are formed at positions shifted from each other by 180° in the circumferential direction of first member 310.

Tip 323 of second member 320 is provided with two recesses 323A and two protrusions 323B, which are arranged in the circumferential direction of second member 320. Each of recesses 323A is recessed in a direction of separating away from first member 310, and each of protrusions 323B protrudes in a direction of approaching first member 310. Two recesses 323A have the same shape, and are formed at positions shifted from each other by 180° in the circumferential direction of second member 320. Also, two protrusions 323B have the same shape, and are formed at positions shifted from each other by 180° in the circumferential direction of second member 320.

Recess 315A of stepped portion 315 and protrusion 323B of tip 323 can be engaged with each other, whereas protrusion 315B of stepped portion 315 and recess 323A of tip 323 can be engaged with each other. Therefore, second member 320 can be fixed to first member 310 at a first angle and a second angle, which are shifted from each other by 180° in the circumferential direction.

In comparison between a first state in which second member 320 is attached to first member 310 at the first angle and bicycle light 300 is fixed to the bicycle and a second state in which second member 320 is attached to first member 310 at the second angle and bicycle light 300 is fixed to the bicycle, a light distribution of the emitted light from light emitter 313 to the front of bicycle light 300 is vertically inverted. In other word, the first angle (first state) and the second angle (second state) are set to attain vertical inversion of the light distribution of the light from light emitter 313 with bicycle light 300 being fixed to the bicycle. Specifically, a positional relation is adjusted between each of recesses 315A, 323A and protrusions 315B, 323B and bracket attachment portion 322 in second member 320.

Also in the present embodiment, as with the first and second embodiments, since second member 320 can be fixed to first member 310 at the first angle and the second angle, which are shifted from each other by 180° in the circumferential direction, the light distribution of the emitted light from light emitter 313 can be vertically inverted. Therefore, even when the attachment direction of bicycle light 300 that provides a vertically asymmetrical light distribution has to be vertically inverted due to some reason in attaching bicycle light 300 to the bicycle, a light distribution comparable to the light distribution before changing the attachment direction can be realized.

Fourth Embodiment

Figure 17:
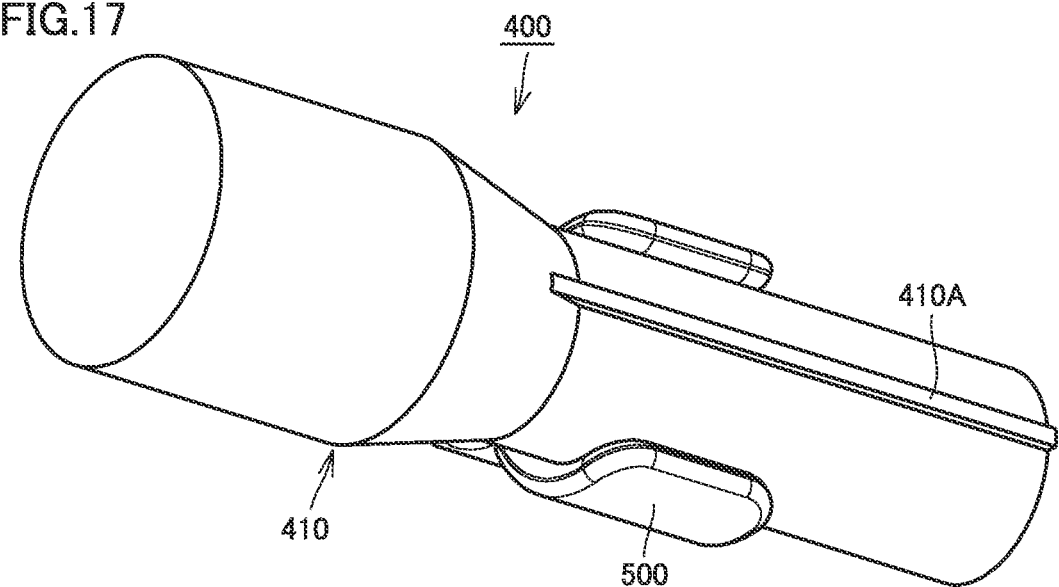
FIG. 17 is a perspective view showing a state in which a bicycle light according to a fourth embodiment of the present invention is attached to a bracket.
Figure 18:
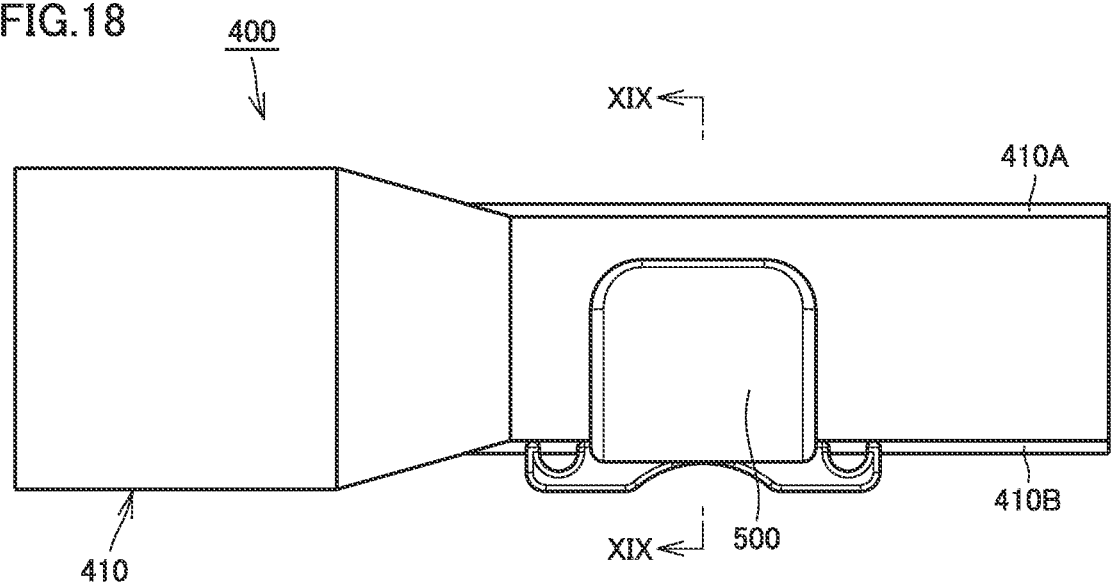
FIG. 18 is a side view showing the state in which the bicycle light according to the fourth embodiment of the present invention is attached to the bracket.

With reference to FIG. 17 to FIG. 19, the following describes a light-vehicle light according to a fourth embodiment. FIG. 17 is a perspective view showing a state in which a bicycle light 400 (light-vehicle light) according to the present embodiment is attached to a bracket 500. FIG. 18 is a side view showing the state in which bicycle light 400 is attached to bracket 500. FIG. 19 is a cross sectional view along XIX-XIX in FIG. 18.

Bicycle light 400 according to the fourth embodiment is a modification of each of those of the first to third embodiments. As shown in FIG. 17 to FIG. 19, bicycle light 400 includes a main body 410. Main body 410 includes the same light emitter as each of those in the first to third embodiments, and detailed explanation thereof will not be repeated.

As shown in FIG. 17 to FIG. 19, a first protrusion 410A and a second protrusion 410B are formed in main body 410 at positions shifted by 180° in the circumferential direction of main body 410.

First protrusion 410A and second protrusion 410B have the same shape. By engaging one of first protrusion 410A and second protrusion 410B with a groove portion 500A of bracket 500, bicycle light 400 is fixed to bracket 500. Therefore, bicycle light 400 can be fixed to bracket 500 at a first angle and a second angle, which are shifted from each other by 180° in the circumferential direction.

In comparison between a first state in which bicycle light 400 is attached to bracket 500 at the first angle and is fixed to the bicycle and a second state in which bicycle light 400 is attached to bracket 500 at the second angle and is fixed to the bicycle, the light distribution of the emitted light to the front of bicycle light 400 is vertically inverted.

Also in the present embodiment, as with the first to third embodiments, bicycle light 400 can be fixed to bracket 500 at the first angle and the second angle, which are shifted from each other by 180° in the circumferential direction. Hence, even when the attachment direction of bicycle light 400 that provides a vertically asymmetrical light distribution has to be vertically inverted due to some reason in attaching bicycle light 400 to the bicycle, a light distribution comparable to the light distribution before changing the attachment direction can be realized.

Modification

In the above-described examples, the bicycle lights each fixable at the two angles (the first angle and the second angle) for vertical inversion have been described; however, there may be employed a bicycle light fixable at four angles shifted at an equal interval of 90°, for example. When the bicycle light is fixed at a position shifted by 90°, the original light distribution can be maintained even if the bicycle light is fixed to a vertical bar of the bicycle instead of a horizontal bar, for example. Further, the scope of the present invention is not limited to the "two or four angles". It should be interpreted that the scope of the present disclosure includes a light-vehicle light including a light emitter detachably fixable to a fixture at a "plurality of selective angles" around an axis in a forward/backward direction of the "light vehicle" as long as the "first and second angles for vertical inversion" are included.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A light-vehicle light attachable to a light vehicle using a fixture, the light-vehicle light comprising:
   a first member including a light emitter; and
   a second member including a region fixable to the fixture,
   wherein the first member is detachably fixable to the second member at a plurality of selective angles including a first angle and a second angle for vertical inversion of a light distribution of light from the light emitter with respect to the second member,
   the first member includes a housing in which a stepped portion is formed,
   the second member includes a cylindrical portion which is placed over and engaged with the housing so as to bring a tip of the second member into abutment with the stepped portion of the first member,
   the stepped portion formed in housing is provided with two first recesses and two first protrusions, which are arranged in the circumferential direction of first member,
   the two first recesses have the same shape and are formed at positions shifted from each other by 180° in the circumferential direction of the first member, and
   the two first protrusions have the same shape and are formed at positions shifted from each other by 180° in the circumferential direction of the first member, the tip of the second member is provided with two second recesses and two second protrusions, which are arranged in the circumferential direction of the second member, the two second recesses have the same shape and are formed at positions shifted from each other by 180° in the circumferential direction of the second member, the two second protrusions have the same shape and are formed at positions shifted from each other by 180° in the circumferential direction of the second member, the first recess of the stepped portion and the second protrusion of the tip is configured to be engaged with each other, and the first protrusion of the stepped portion and the second recess of the tip is configured to be engaged with each other.

2. A light-vehicle light attachable to a light vehicle using a fixture, the light-vehicle light comprising:

a first member including a light emitter; and a second member including a region fixable to the fixture, wherein the first member is detachably fixable to the second member at a plurality of selective angles including a first angle and a second angle for vertical inversion of a light distribution of light from the light emitter with respect to the second member, the second member includes a power supply storage that stores a power supply that supplies power to the light emitter, and the first member is configured to be attached to and fixed to the second member at the first angle and the second angle, which are shifted from each other by 180°.

3. A light-vehicle light attachable to a light vehicle using a fixture, the light-vehicle light comprising:

a first member including a light emitter; and a second member including a region fixable to the fixture, wherein the first member is detachably fixable to the second member at a plurality of selective angles including a first angle and a second angle for vertical inversion of a light distribution of light from the light emitter with respect to the second member, the first member includes a housing in which a stepped portion is formed, the second member includes a cylindrical portion which is placed over and engaged with the housing so as to bring a tip of the second member into abutment with the stepped portion of the first member, and the first member includes a power supply storage that stores a power supply that supplies power to the light emitter.

4. A light-vehicle light attachable to a light vehicle using a fixture, the light-vehicle light comprising:

a first member including a light emitter; and a second member including a region fixable to the fixture, wherein the first member is detachably fixable to the second member at a plurality of selective angles including a first angle and a second angle for vertical inversion of a light distribution of light from the light emitter with respect to the second member, the first member includes a housing in which a stepped portion is formed, the second member includes a cylindrical portion which is placed over and engaged with the housing so as to bring a tip of the second member into abutment with the stepped portion of the first member, the first recesses are recessed in a direction of separating away from the second member, the first protrusions protrude in a direction of approaching the second member, the second recesses are recessed in a direction of separating away from the first member, and the second protrusions protrude in a direction of approaching the first member.

5. A light-vehicle light attachable to a light vehicle using a fixture, the light-vehicle light comprising:

a first member including a light emitter; and a second member including a region fixable to the fixture, wherein the first member is detachably fixable to the second member at a plurality of selective angles including a first angle and a second angle for vertical inversion of a light distribution of light from the light emitter with respect to the second member, the first member includes a housing in which a stepped portion is formed, the second member includes a cylindrical portion which is placed over and engaged with the housing so as to bring a tip of the second member into abutment with the stepped portion of the first member, and the stepped portion formed in housing is provided with two first recesses and two first protrusions, which are arranged in the circumferential direction of first member.

6. The light-vehicle light according to claim 5, wherein the two first recesses have the same shape and are formed at positions shifted from each other by 180° in the circumferential direction of the first member.

7. The light-vehicle light according to claim 5, wherein the two first protrusions have the same shape and are formed at positions shifted from each other by 180° in the circumferential direction of the first member.

8. A light-vehicle light attachable to a light vehicle using a fixture, the light-vehicle light comprising:

a first member including a light emitter; and a second member including a region fixable to the fixture, wherein the first member is detachably fixable to the second member at a plurality of selective angles including a first angle and a second angle for vertical inversion of a light distribution of light from the light emitter with respect to the second member, the first member includes a housing in which a stepped portion is formed, the second member includes a cylindrical portion which is placed over and engaged with the housing so as to bring a tip of the second member into abutment with the stepped portion of the first member, and the tip of the second member is provided with two second recesses and two second protrusions, which are arranged in the circumferential direction of the second member.

9. The light-vehicle light according to claim 8, wherein the two second recesses have the same shape and are formed at positions shifted from each other by 180° in the circumferential direction of the second member.

10. The light-vehicle light according to claim 8, wherein the two second protrusions have the same shape and are formed at positions shifted from each other by 180° in the circumferential direction of the second member.

11. A light-vehicle light attachable to a light vehicle using a fixture, the light-vehicle light comprising:

a first member including a light emitter; and a second member including a region fixable to the fixture, wherein the first member is detachably fixable to the second member at a plurality of selective angles including a first angle and a second angle for vertical inversion of a light distribution of light from the light emitter with respect to the second member, the first member includes a housing in which a stepped portion is formed, the second member includes a cylindrical portion which is placed over and engaged with the housing so as to bring a tip of the second member into abutment with the stepped portion of the first member, the stepped portion formed in housing is provided with two first recesses and two first protrusions, the tip of the second member is provided with two second recesses and two second protrusions, the first recess of the stepped portion and the second protrusion of the tip is configured to be engaged with each other, and the first protrusion of the stepped portion and the second recess of the tip is configured to be engaged with each other.

\* \* \* \* \*